Oct. 16, 1951　　　H. W. TREVASKIS　　　2,571,500
DEVICE FOR SEALING THE JOINT BETWEEN THE SURFACES
OF TWO RELATIVELY ROTATABLE MEMBERS
Filed Sept. 9, 1947　　　　　　　　　　　　2 Sheets-Sheet 1

Inventor
Henry William Trevaskis
by Benj. T. Rauber
his attorney

Oct. 16, 1951    H. W. TREVASKIS    2,571,500
DEVICE FOR SEALING THE JOINT BETWEEN THE SURFACES
OF TWO RELATIVELY ROTATABLE MEMBERS
Filed Sept. 9, 1947    2 Sheets-Sheet 2

Inventor
Henry William Trevaskis
by Benj. T. Rauber
his attorney.

UNITED STATES PATENT OFFICE 2,571,500

DEVICE FOR SEALING THE JOINT BETWEEN THE SURFACES OF TWO RELATIVELY ROTATABLE MEMBERS

Henry William Trevaskis, Solihull, Birmingham, England, assignor to Dunlop Rubber Company Limited, London, England, a British corporation Application September 9, 1947, Serial No. 772,928
In Great Britain September 25, 1946

3 Claims. (Cl. 286—7)

My invention relates to sealing devices and is particularly concerned with a device for sealing the joint between the surfaces of two relatively rotatable members.

The invention is of particular utility in its application to a rotary, including oscillatory member passing through the wall of the cabin of an aircraft intended for flying at high altitude at which it is necessary to maintain the air within the cabin at a pressure higher than that of the external atmosphere.

Difficulty is encountered in preventing leakage from such pressure chambers when pierced by members having a rotary, including oscillatory, movement.

The invention has for an object to enable such rotary movement to be transmitted from the interior to the exterior of an aircraft cabin or other pressure chamber without leakage therefrom.

According to the invention a device for sealing the joint between the surfaces of two relatively rotatable members comprises a non-circular endless groove in one of the members, a jointless ring of resilient material fitting in said groove and resiliently pressing against the surface of the other member, and lubricating pads inset in one of said members and so positioned that lubricant therefrom lubricates the interface between the ring and the member against which it presses during relative rotation.

In one form of the construction according to the invention, suitable for a rotatable shaft passing through the wall of an aircraft cabin, the device comprises a gland adapted to be attached to the wall of the cabin, a shaft carried by the gland, a non-circular endless groove in the periphery of the shaft within the gland, a jointless rubber ring tightly fitting in the groove and resiliently pressing against the surface of the gland and lubricating pads inset in the shaft and so placed that lubricant therefrom lubricates the surface of the gland against which the ring presses when the shaft rotates. Alternatively the pads, groove and ring of resilient material may be provided in the gland. Suitable guides may be provided for each end of the rotatable member independently of the gland, or the gland may itself support and guide the rotary shaft.

According to another form of construction there is provided a shaft, a collar keyed to the shaft and having a flange adapted to bear against the wall of a pressure chamber, means for maintaining the flange in contact with the said wall, a jointless rubber ring tightly fitting in a non-circular endless groove in the flange and resiliently pressing against the wall and lubricating pads so placed that the lubricant therefrom lubricates the surface of the wall against which the ring presses when the shaft is rotated.

In order that the invention may be more readily understood and carried into effect the same will now be more readily described with reference to the accompanying drawings in which.

Figure 1:
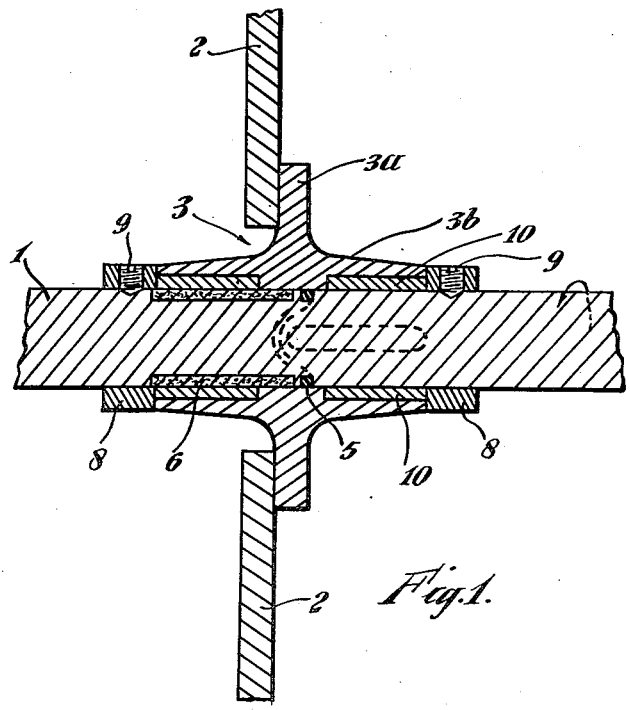
Fig. 1 shows a sectional elevation of one embodiment of the invention and—

In Fig. 1 the shaft 1 is carried in a gland 3 which comprises a sleeve 3b extending along the shaft and a flange 3a which may be secured in any suitable manner to a partition 2.

An endless and jointless ring of rubber 5 is located in a non-circular groove in the surface of the shaft and presses resiliently against the internal surface of the sleeve.

In order to prevent undue friction and wear lubricating pads 6 are provided. These pads are inserted within recesses formed in the shaft surface and are of absorbent material, soaked with lubricant.

As can be seen the pads are situated within the sinuations of the ring 5 so that when the shaft rotates they contact with the entire area of the internal surface of the gland 3 which is in contact with the ring 5 so that the said surface becomes lubricated.

Collars 8 are provided around the shaft 1, these being secured to the shaft by grub screws 9 or the like. Bronze liners 10 are also provided as a bearing support for the shaft.

Figure 2:
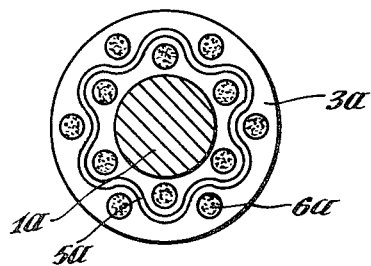
Figs. 2 and 3 show end and side sectional elevations respectively of another embodiment.
Figure 3:
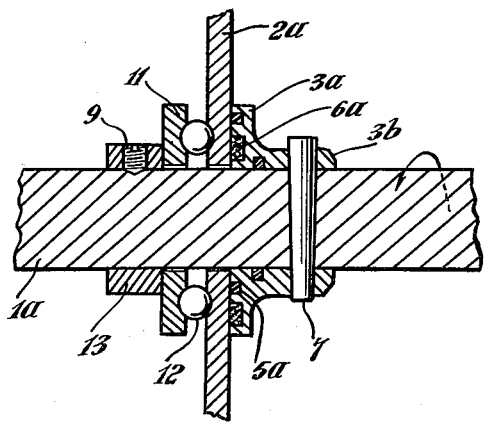

In the embodiment of Figs. 2 and 3 the shaft 1a passes through the partition 2a to which it is to be rotatably secured.

The shaft carries on one side of the partition a member having a flanged portion 3a and a sleeve portion 3b, which is keyed to the shaft by the taper pin 7.

The face of the flange adjacent the partition has an endless sinuous groove formed therein into which is pressed an endless resilient ring 5a of rubber or like material.

Absorbent lubricating pads 6a are located in recesses in the flange surface between the sinuations of the ring 5a so that the entire area engaged by the ring is lubricated.

The flange is held firmly against the partition so that both the ring 5 and lubricating pads 6a press on the partition surface by means of ball bearings 12 located between the opposite side of the partition and a disc 11, which is maintained in position by a collar 13 fixed to the shaft by a grub screw 9.

Preferably the groove is substantially rectangular in cross section.

Figure 4:
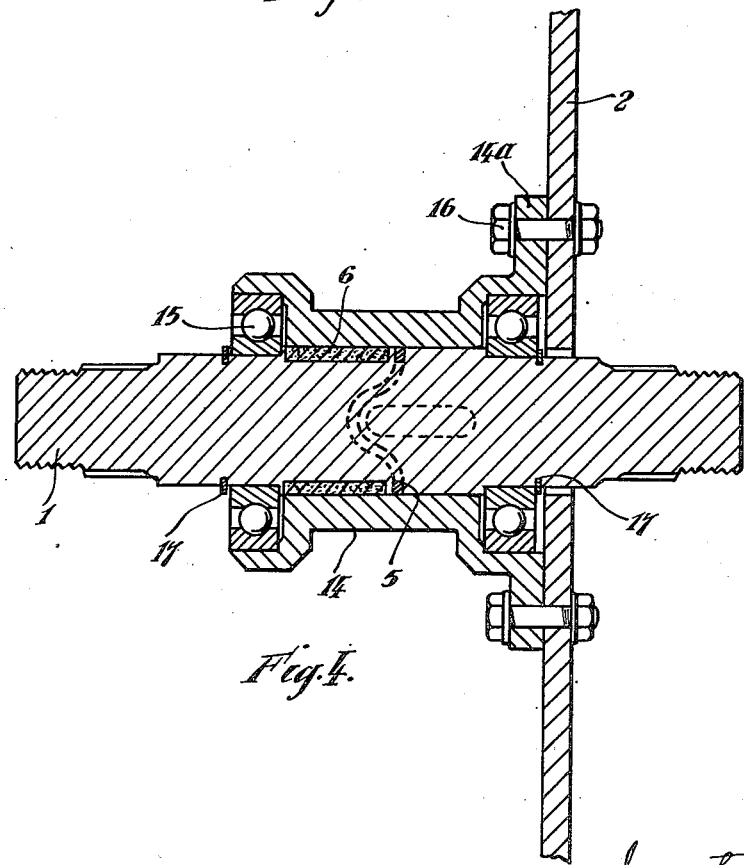
Fig. 4 shows a sectional elevation of a third embodiment.

Fig. 4 shows a sealing device similar to that shown in Fig. 1 in which ball bearings are employed and which is suitable for a member subjected to pure rotation.

The gland 14 in this case comprises a housing for the ball bearings 15 which are located in races secured in the gland ends.

One end of the gland is provided with a flange 14a which provides a means of securing the gland to the wall 2 by means of nuts and bolts 16. A sealing ring 5 is located in a sinuous groove formed on the shaft 1, the ring being made of resilient material such as rubber so that it can be firmly pressed into sealing engagement with the inside surface of the gland 14. Felt lubricating pads 6 are placed between the sinuations of the ring 5 in such manner that the entire area engaged by the ring 5 is lubricated. Two contracting spring rings 17 engaging in grooves in the shaft 1 at the housing ends serve to locate the inner races of the ball bearings.

It is to be understood that where the context permits the term "rotary" as used in the description and claims covers both pure unidirectional motion and also oscillatory motion.

Having described my invention, what I claim is:

1. In a device for sealing the joint between the contacting surfaces of two relatively rotatable members, a non-circular endless groove of sinuous form in one of the said members, a jointless ring of resilient material fitting in said groove and resiliently pressing against the surface of the other member and lubricating pads of absorbent lubricant-impregnated material inset in the member containing said groove on both sides of the ring, the adjacent ends of the pads on the two sides of the ring extending at least to a common circumferential line and the other ends of the pads extending at least to circumferential lines passing through the corresponding apices of the ring.

2. In a device for transmitting rotary motion between the interior and exterior of a pressure chamber, a gland to be attached to a wall of the chamber, a shaft carried by the gland, a non-circular endless groove of sinuous form in the periphery of the shaft within the gland, a jointless rubber ring tightly fitting in the groove and resiliently pressing against the surface of the gland and lubricating pads of absorbent, lubricant-impregnated material inset in the shaft on both sides of the ring, the adjacent ends of the pads on the two sides of the ring extending at least to a common circumferential line and the other ends of the pads extending at least to circumferential lines passing through corresponding apices of the ring.

3. In a device for transmitting rotary motion between the interior and exterior of a pressure chamber a shaft, a collar keyed to the shaft having a flange adapted to bear against the wall of the pressure chamber, and having a non-circular endless groove of sinuous form in the face of said flange opposed to said wall, means for maintaining the flange in contact with the wall, a jointless rubber ring tightly fitting in said groove in the flange and resiliently pressing against the wall and lubricating pads of absorbent, lubricant-impregnated material inset in the flange on both sides of the ring, the adjacent ends of the pads on the two sides of the ring extending at least to a common circumferential line and the other ends of the pads extending at least to circumferential lines passing through the corresponding apices of the ring.

HENRY WILLIAM TREVASKIS.

REFERENCES CITED

The following references are of record in the file of this patent:

UNITED STATES PATENTS

| Number | Name | Date |
| --- | --- | --- |
| 5,323 | Thayer | Mar. 11, 1873 |
| 737,639 | Lewis et al. | Sept. 1, 1903 |
| 1,349,060 | Gall et al. | Aug. 10, 1920 |
| 2,366,729 | Hanson | Jan. 9, 1945 |
| 2,444,874 | Hanson | July 6, 1948 |